(12) United States Patent
Dunham (10) Patent No.: US 12,218,491 B2
(45) Date of Patent: Feb. 4, 2025

(54) SIDE PROTECTOR FOR UTILITY BOX PADS

(71) Applicant: Sean Dunham, Lake Elmo, MN (US)

(72) Inventor: Sean Dunham, Lake Elmo, MN (US)

( * ) Notice: Subject to any disclaimer, the term of this patent is extended or adjusted under 35 U.S.C. 154(b) by 42 days.

(21) Appl. No.: 17/881,393

(22) Filed: Aug. 4, 2022

(65) Prior Publication Data

US 2023/0040838 A1 Feb. 9, 2023

Related U.S. Application Data

(60) Provisional application No. 63/229,413, filed on Aug. 4, 2021.

(51) Int. Cl.
*H02B 1/50* (2006.01)
*F16M 11/22* (2006.01)

(52) U.S. Cl.
CPC .............. *H02B 1/50* (2013.01); *F16M 11/22* (2013.01); *F16M 2200/08* (2013.01)

(58) Field of Classification Search
CPC ....... H02B 1/50; F16M 11/22; F16M 2200/08
See application file for complete search history.

(56) References Cited

U.S. PATENT DOCUMENTS

| | | | | |
|---|---|---|---|---|
| 405,658 | A * | 6/1889 | Campany | E04H 12/2292 52/170 |
| 3,713,620 | A * | 1/1973 | Tkach | F16M 7/00 52/295 |
| 3,841,032 | A * | 10/1974 | Grannis, III | E02D 5/80 52/157 |
| 4,516,365 | A * | 5/1985 | Chapman | E04H 12/2292 52/514 |
| 5,065,972 | A * | 11/1991 | Buckshaw | A47B 95/043 206/586 |
| 6,518,499 | B1 * | 2/2003 | Kessler | F16M 5/00 174/37 |
| 9,743,524 | B1 * | 8/2017 | Lee | H01G 4/30 |
| 10,794,028 | B1 * | 10/2020 | Rowland | E02D 17/00 |
| 11,680,380 | B2 * | 6/2023 | Dunham | E02D 31/00 248/346.01 |
| 2004/0025993 | A1 * | 2/2004 | Russell | F16M 11/22 248/125.1 |
| 2022/0396958 | A1 * | 12/2022 | Dunham | E04G 23/02 |

* cited by examiner

*Primary Examiner* — Eret C McNichols
(74) *Attorney, Agent, or Firm* — Pauly, DeVries Smith & Deffner LLC (57) ABSTRACT

Embodiments herein relate to a protective cover. In an embodiment, a sidewall cover for protecting a reinforcing element of a utility box pad is disclosed. The sidewall cover has a protective shield configured to extend over at least a portion of the sidewall reinforcing element. The protective shield can include a pointed blade configured to be pressed into the ground adjacent the utility box pad. Other embodiments are also included herein.

15 Claims, 10 Drawing Sheets

SIDE PROTECTOR FOR UTILITY BOX PADS

This application claims the benefit of U.S. Provisional Application No. 63/229,413 filed Aug. 4, 2021, the content of which is herein incorporated by reference in its entirety.

FIELD

Embodiments herein relate to side protectors and, more specifically, to side protectors for utility box pads.

BACKGROUND

Electrical and communication boxes provide homes and businesses with basic utilities such as electricity and internet, while also providing an easy access point for utility and communication workers to make repairs as needed. Often, these electrical and communication boxes will sit on a fiberglass box pad partially buried in the ground. The fiberglass box pad provides a durable foundation and stabilizes the electrical and communication boxes. However, because part of the fiberglass box pad remains above ground, the sides are vulnerable to damage. Often, the sides of the fiberglass box pad are damaged by mowers, tractors, weed trimmers, shovels, and the like.

Any structural breaks in the fiberglass box pad can inhibit the performance, reliability, and safety of the electrical and communication boxes. This is because once a structural break occurs, animals, unqualified persons, children, dust, water, and dirt can all access the equipment stored in the electrical and communication boxes.

Presently, when a fiberglass box pad is damaged, utility and communication workers must dig up the ground around the fiberglass box pad to fully expose the damaged portion and then a glue-like fiber patch is affixed to the fiberglass box pad to repair the damaged portion. This method of maintenance of fiberglass box pads is reactionary in nature and increases the costs associated with electrical and communication boxes.

SUMMARY

The present disclosure relates to protective covers for electrical and communication boxes. The protective covers can be used to prevent damage to the side of the boxes, as well as to repair existing boxes that have developed holes.

Side protectors allow for the sides of the fiberglass box pad to be protected from damage that can occur during yard work. Embodiments can include side protectors for fiberglass box pads. The side protectors can act as a preventative measure that can be installed during or after the installation of fiberglass box pads in the ground. The side protectors can prevent mowers, tractors, weed trimmers, shovels, and the like from directly contacting the fiberglass box pad thereby decreasing the risk of damage to the fiberglass box pad. Because the side protector is a preventative measure, it can be cheaper to maintain the fiberglass box pads and it can be faster to install the side protectors than repairing any damage that occurs to the fiberglass box pads. Additionally, the side protectors can extend the life of the fiberglass box pad by preventing any structural breaks in the fiberglass box pad.

In an embodiment, a sidewall cover for protecting sidewall reinforcing element of a utility box pad has a protective shield configured to extend over at least a portion of the sidewall reinforcing element, the protective shield can include a pointed blade configured to be pressed into the ground adjacent the utility box pad. In an embodiment, the lip is positioned at the opposite end of the sidewall reinforcing element relative to the pointed blade.

In an embodiment, at least one side flange extends from the protective shield.

In an embodiment, at least two side flanges extend from the protective shield.

In an embodiment, an air pocket is formed between the protective shield and the reinforcing element. In an embodiment, the air pocket includes a central volume and two side volumes, the central and side volumes conforming to the surface of the sidewall reinforcing element.

In an embodiment, the air pocket includes a central volume and two side volumes. The central volume can include protrusions in contact with the surface of the reinforcing element and the side volumes not in contact with the reinforcing element.

In an embodiment, the air pocket includes a plurality of protrusions extending into the air pocket. In an embodiment, the air pocket is filled with a flexible material. In an embodiment, the flexible material includes foam. In an embodiment, the plurality of protrusions extending into the air pocket make contact with the sidewall reinforcing element. In an embodiment, the plurality of protrusions extending into the air pocket include elongate ribs.

In an embodiment, an air pocket extends around three sides of the reinforcing element.

In an embodiment, the shield includes an exterior taper.

In an embodiment, the shield has an interior taper reverse of the exterior taper In an embodiment, the reinforcing element has a wedge shaped cross section.

In an embodiment, at least one hole in the side flange is provided for inserting a fastener for securing the side flange to the utility box pad.

In an embodiment, the protector can further include one or more anti-heave protrusions. In an embodiment, one or more anti-heave protrusions are positioned on the pointed blade.

In an embodiment, the one or more anti-heave protrusions protrude outward from the pointed blade. In an embodiment, the one or more anti-heave protrusions are hollow. In an embodiment, the one or more anti-heave protrusions include a polygonal structure that extends from the pointed blade at an angle.

In an embodiment, the one or more glue channels are positioned on the first plate and the second plate.

In an embodiment, the one or more glue channels include a glue injection hole.

In an embodiment, the sidewall cover includes a unibody structure.

In an embodiment, the sidewall cover is formed from high-density polyethylene.

In an embodiment, the sidewall cover has a length of 12 inches to 18 inches.

In an embodiment, a sidewall cover for protecting sidewall reinforcing element of a utility box pad, the sidewall cover is included having a protective shield configured to extend over at least a portion of the sidewall reinforcing element, the protective shield can include a pointed blade configured to be pressed into the ground adjacent the utility box pad, further can include a lip, wherein the lip is positioned at the opposite end of the sidewall reinforcing element relative to the pointed blade, further can include at least one side flange extending from the protective shield, and further can include an air pocket behind the protective shield.

In an embodiment, the air pocket includes a central volume and two side volumes, the central and side volumes conforming to the surface of the sidewall reinforcing element.

In an embodiment, the air pocket includes a central volume and two side volumes, the central volume can include protrusions in contact with the surface of the reinforcing element and the side volumes not in contact with the reinforcing element.

In an embodiment, further can include an air pocket behind the protective shield.

In an embodiment, the air pocket is filled with a flexible material.

In an embodiment, the flexible material includes foam.

In an embodiment, the air pocket includes a plurality of protrusions extending into the air pocket.

In an embodiment, the side protectors include a plurality of protrusions extending into the air pocket and they make contact with the sidewall reinforcing element.

In an embodiment, the plurality of protrusions extending into the air pocket include elongate ribs.

In an embodiment, the air pocket extends around three sides of the reinforcing element.

In an embodiment, the blade includes an exterior taper.

In an embodiment, the blade includes a shield with an interior taper reverse of the exterior taper.

In an embodiment, the reinforcing element has a wedge-shaped cross section.

In an embodiment, the side protectors can further include at least one hole in the side flange for inserting a fastener for securing the side flange to the utility box pad.

In an embodiment, the side protectors can include one or more anti-heave protrusions.

In an embodiment, the side protectors can include one or more anti-heave protrusions positioned on the pointed blade.

In an embodiment, the one or more anti-heave protrusions protrude outward from the pointed blade.

In an embodiment, the one or more anti-heave protrusions are hollow.

In an embodiment, the one or more anti-heave protrusions include a polygonal structure that extends from the pointed blade at an angle.

In an embodiment, the flange can further include one or more glue channels.

In an embodiment, the one or more glue channels can include a glue injection hole.

In an embodiment, the sidewall cover includes a unibody structure.

In an embodiment, the sidewall cover is formed from high-density polyethylene.

In an embodiment, the sidewall cover has a length of 12 inches to 18 inches.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.) in which.

While embodiments are susceptible to various modifications and alternative forms, specifics thereof have been shown by way of example and drawings, and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

Electrical and communication boxes rest on fiberglass box pads to stabilize the boxes and provide a durable foundation. The fiberglass box pads will often be partially buried in the ground, however, the part of the fiberglass box pad that remains above ground is vulnerable to damage. Specifically, the sides of the fiberglass box pad are vulnerable to damage. Often, the sides of the fiberglass box pad are damaged by mowers, tractors, weed trimmers, shovels, and the like.

Side protectors allow for the sides of the fiberglass box pad to be protected from damage that can occur during yard work. Embodiments herein, can include side protectors for fiberglass box pads. The side protectors can act as a preventative measure that can be installed during or after the installation of fiberglass box pads in the ground. The side protectors can prevent mowers, tractors, weed trimmers, shovels, and the like from directly contacting the fiberglass box pad thereby decreasing the risk of damage to the fiberglass box pad. Because the side protector is a preventative measure, it can be cheaper to maintain the fiberglass box pads and it can be faster to install the side protectors than repairing any damage that occurs to the fiberglass box pads. Additionally, the side protectors can extend the life of the fiberglass box pad by preventing any structural breaks in the fiberglass box pad.

In an embodiment, a sidewall cover for protecting sidewall reinforcing elements of a utility box pad, the sidewall cover is included having a protective shield configured to extend over at least a portion of the sidewall reinforcing element, the protective shield can include a pointed blade configured to be pressed into the ground adjacent the utility box pad.

Figure 1:
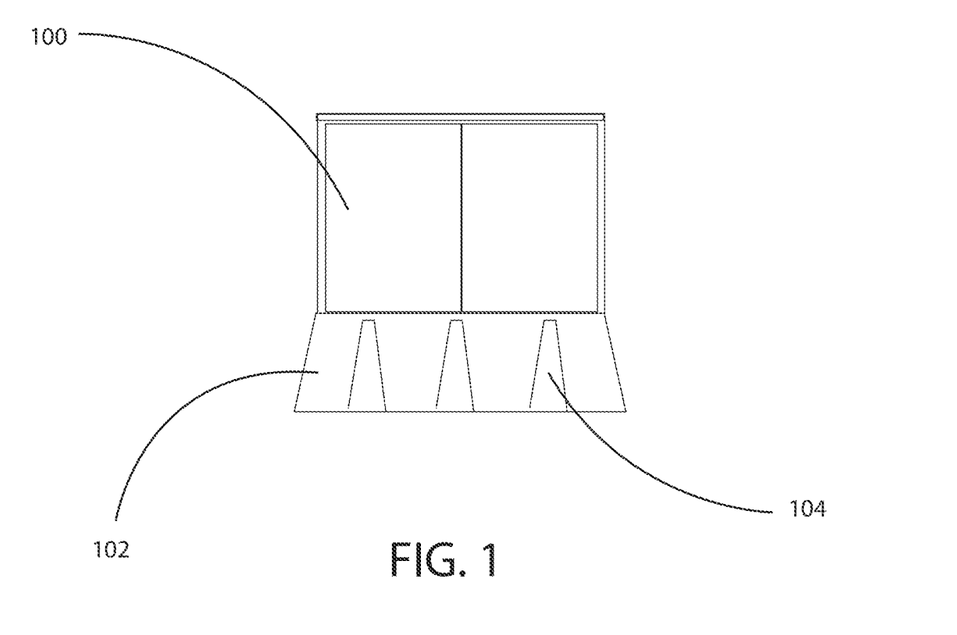
FIG. 1 is a photograph of a utility enclosure box mounted on a fiberglass box pad.
Figure 2:
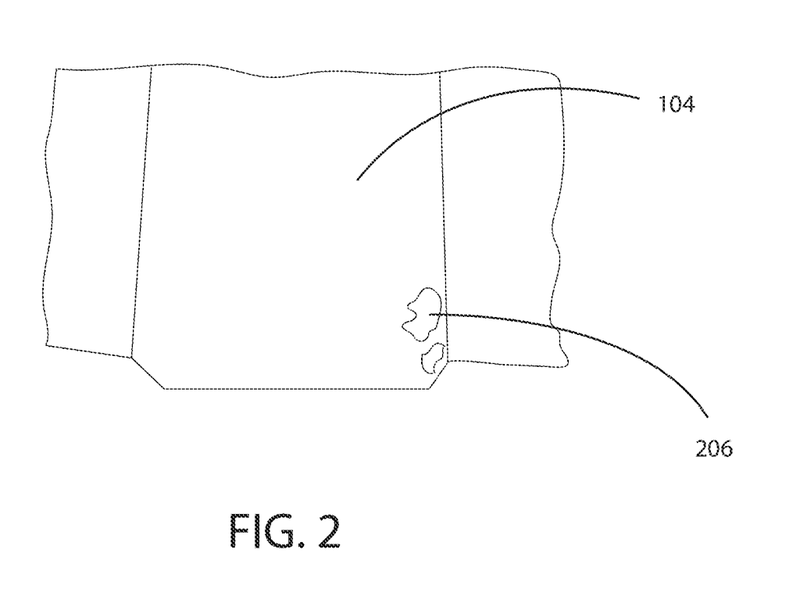
FIG. 2 is a photograph of a closeup of a fiberglass box pad and reinforcing element, showing damage to the reinforcing element from lawn maintenance activities.

FIG. 1 is a photograph of a utility enclosure box 100 mounted on a fiberglass box pad 102, also showing a reinforcing element 104. The reinforcing element 104 provides rigidity and strength to the fiberglass box pad 102. The reinforcing element 104 extends outward from the side of the fiberglass box pad 102, which makes the reinforcing element 104 vulnerable to damage from various sources, in particular lawn care equipment. For example, string trimmers and lawn mowers can all contact the reinforcing element 104 and cause damage to it. Sometimes even apparently minor surface damage can result in creating an opening that can degrade and enlarge over time (especially from additional contact by lawn car equipment). FIG. 2 is a photograph of a closeup of the fiberglass box pad 102 and reinforcing element 104 of FIG. 1, showing damage to the reinforcing element 104 from lawn maintenance activities. In particular, the surface of the reinforcing element 104 has become damaged along its side and a degraded area 206 has formed a hole.

Figure 3:
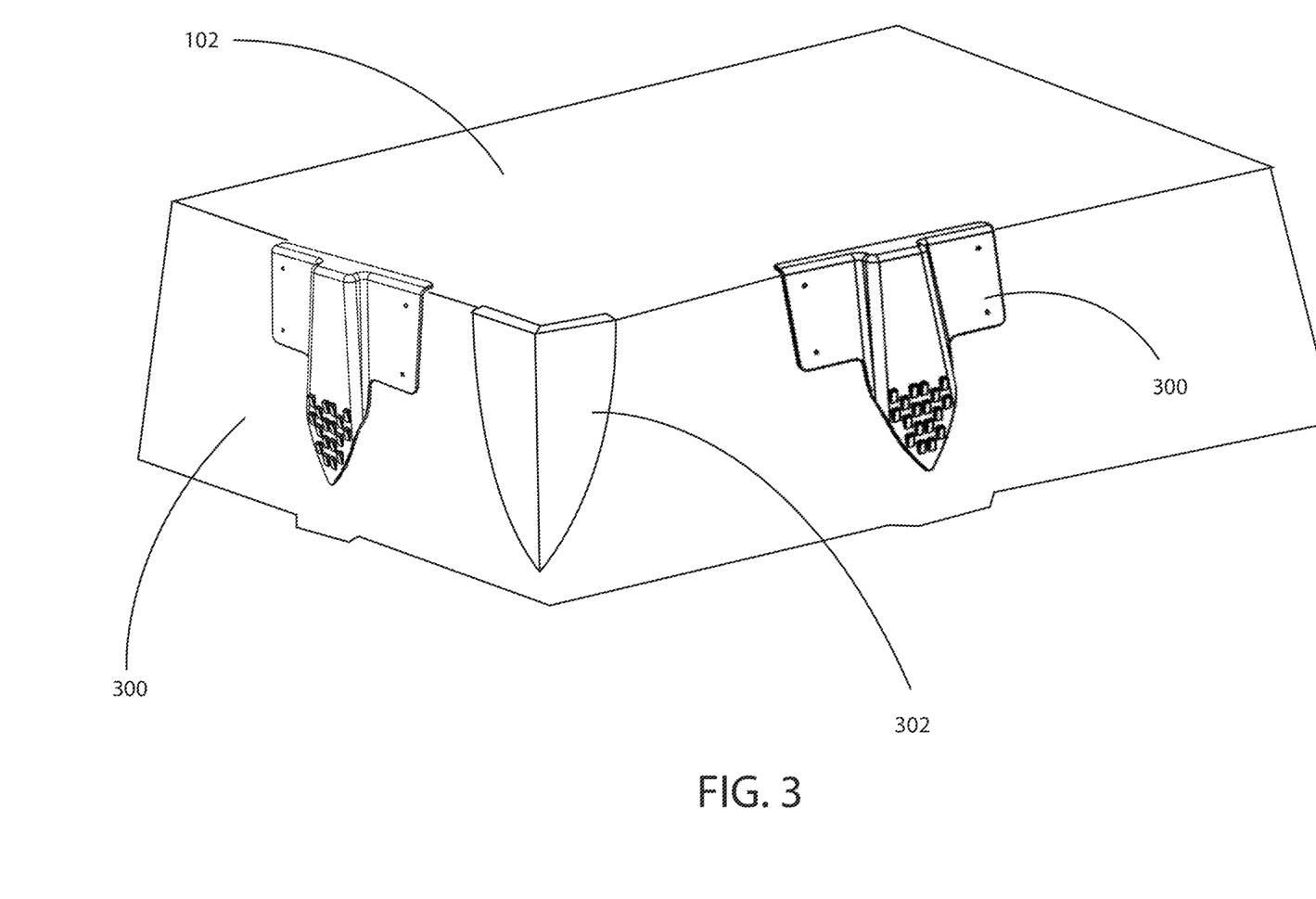
FIG. 3 is a schematic view of a fiberglass box pad (without the enclosure box), showing two side protectors and a corner protector installed on the fiberglass box pad in accordance with various embodiments herein.

FIG. 3 is a schematic view of a fiberglass box pad 102 (without the enclosure box), showing side protectors 300 and a corner protector 302 installed on the fiberglass box pad 102 in accordance with various embodiments herein. FIG. 3 doesn't show the ground level, but typically the ground will extend about halfway up the side protectors 300 (to where side flanges of FIG. 4 extend out). It will be appreciated, however, that the height above or below ground of the side protectors will vary from installation to installation, depending upon how deeply the fiberglass box pad 102 is installed. However, generally it will be desired that the entire above-ground portion of the reinforcing element 104 will be covered by a side protector 300.

Figure 4:
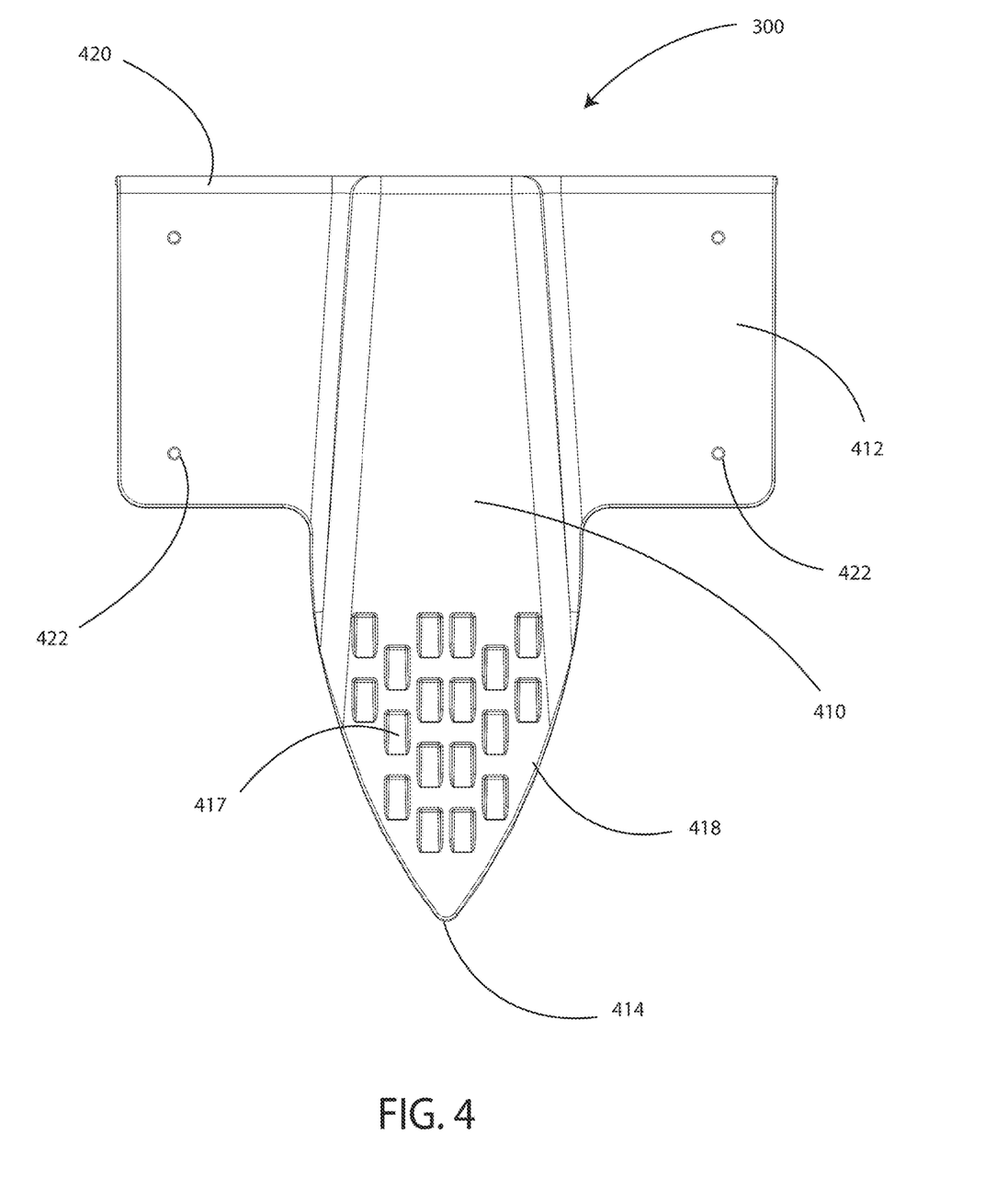
FIG. 4 is a front elevational view of a side protector in accordance with various embodiments herein.

FIG. 4 is a front elevational view of a side protector 300 made in accordance with various embodiments herein. The side protector 300 includes a protective shield 410 that covers exposed portions of the reinforcing element 104. The protective shield 410 prevents damage to the underlying reinforcing element both by shielding the reinforcing the element as well as cushioning any blow to the reinforcing element. As shown in FIG. 4, at least one (and typically two) side flanges 412 extend along the outside of the side protector 300. These side flanges 412 provide a surface to secure the side protector 300 to the fiberglass box pad 102. Generally, the side flanges 412 are relative flat and make contact along their interior surfaces with the fiberglass box pad 102. The side flanges 412 can include a plurality of openings 422 for fasteners, such as screws, to be installed into the fiberglass box pad 102. In addition, it is possible to apply an adhesive material to the backside of the side flanges 412. The adhesive material can be, for example a contact adhesive, but can also be a liquid adhesive injected or applied behind the side flanges 412.

The side protector 300 also includes a top lip 420 extending backward from the side protector 300. The top lip 420 controls the height by which the side protector 300 along the fiberglass box pad 102. This top lip 420 is also shown (and numbered) in FIG. 3.

The side protector 300 also includes a protective shield 410. This protective shield 410 is designed to fit over and conform generally to the reinforcing element 104. The protective shield 410 has a sharp tip 414, along with an external edge 417 designed to slice into the substrate (typically dirt, rock, grass) along the edge of the fiberglass box pad 102. Typically, the interior of the protective shield 410 is designed to have a slight offset from the reinforcing element 104. This offset forms an air pocket between the reinforcing element 104 and the interior of the protective shield 410. One benefit of the air pocket is that it allows for further cushioning of blows between the protective shield 410 of the side protector 300 and the reinforcing element 104. Thus, the protective shield 410 can flex under blows (such as from a lawnmower) and transfer and distribute this force to the side flanges 412 without impacting the reinforcing element 104. In this manner the protective shield 410 and side protector 300 provide particularly good protection to the reinforcing element 104. In addition, the offset (or gap) between the interior of the protective shield 410 and the exterior of the reinforcing element 104 allows for slight variations in different shapes of reinforcing elements 104 (such as differences in taper, thickness, or width).

The side protector 300 also includes a plurality of anti-heave protrusions 418, which helps prevent the side protector from pulling back out of the soil, such as when undergoing freeze and thaw cycles. In an embodiment, the one or more anti-heave protrusions 418 are positioned on the pointed blade. In an embodiment, the one or more anti-heave protrusions 418 protrude outward from the pointed blade of the side protector 300. In an embodiment, the one or more anti-heave protrusions 418 are hollow. In an embodiment, the one or more anti-heave protrusions 418 include a polygonal structure that extends from the pointed blade at an angle.

Figure 5:
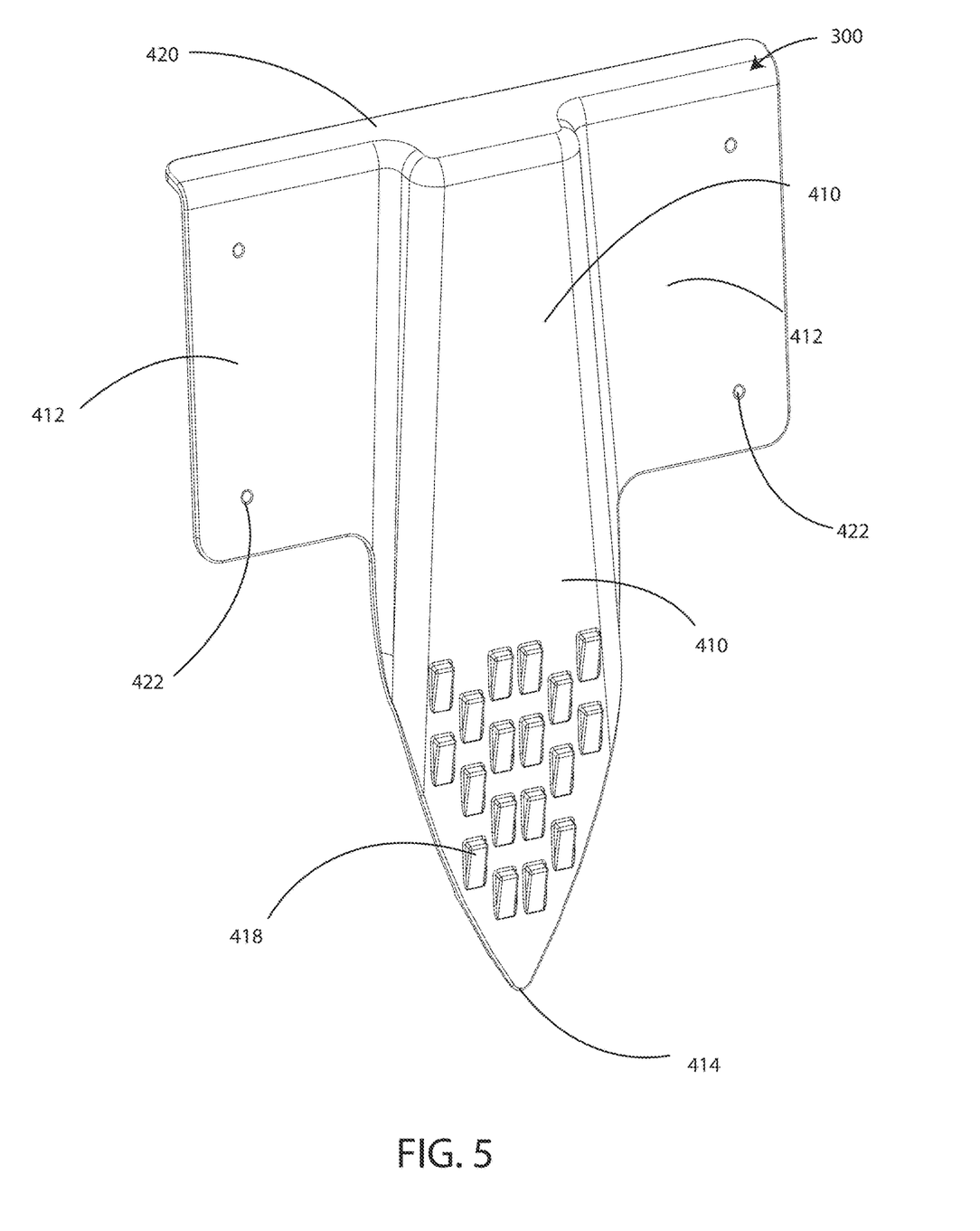
FIG. 5 is a front perspective view of a side protector in accordance with various embodiments herein.

FIG. 5 is a front perspective view of side protector 300 in accordance with various embodiments herein, in particular the embodiment shown in FIG. 4. The side protector 300 includes a top lip 420 that controls the depth of installation of the side protector 300 by contacting the top corner edge of the fiberglass box pad 102. Openings 422 inside flanges 412 are shown, as is sharp tip 414 and external edge 417 of the protective shield 410.

Figure 6:
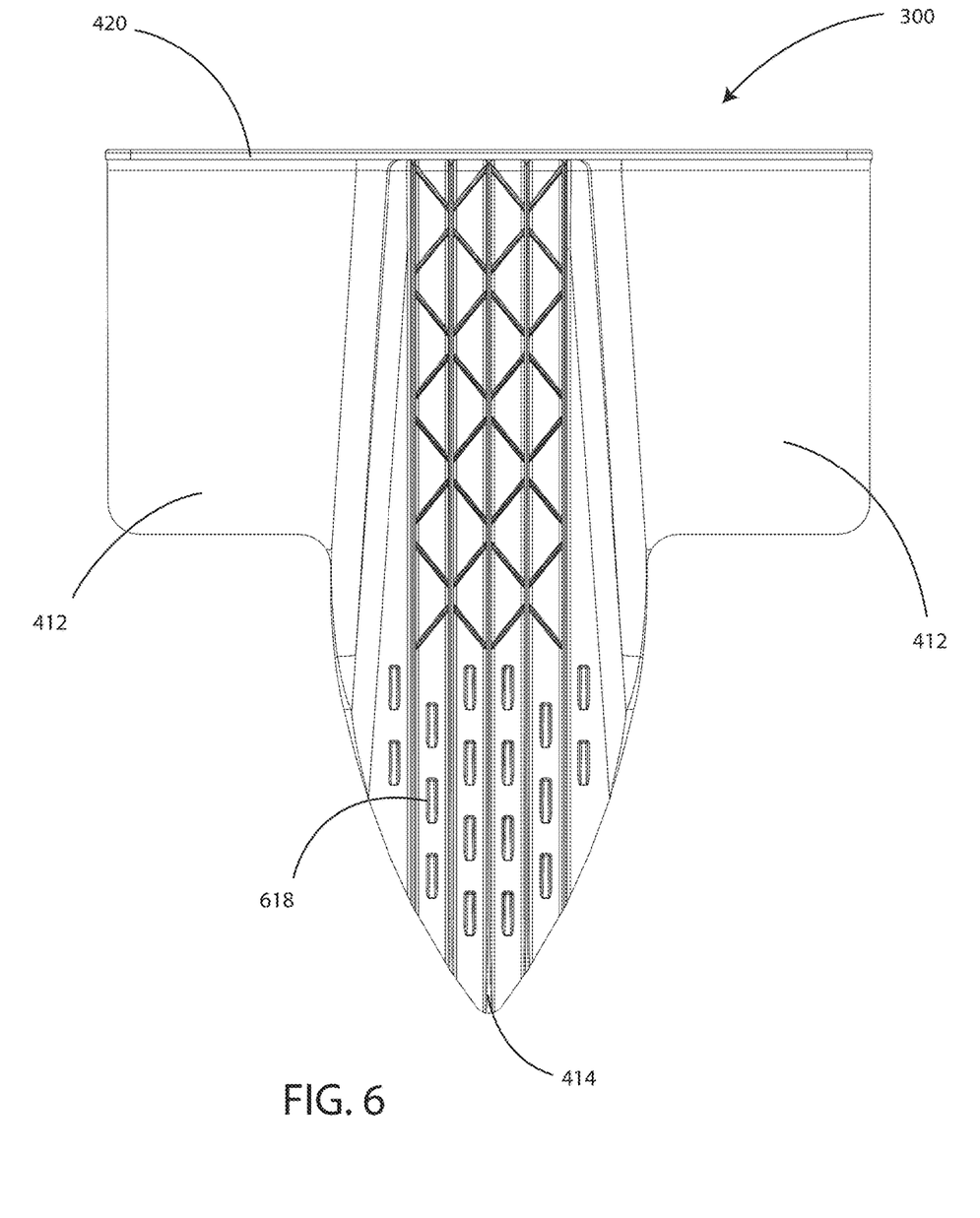
FIG. 6 is a rear elevational view of a side protector in accordance with various embodiments herein.

FIG. 6 is a rear elevational view of side protector 300 in accordance with various embodiments herein, showing protrusions 618 (in this case ribs) that extend from the interior of the protective shield 410.

Figure 7:
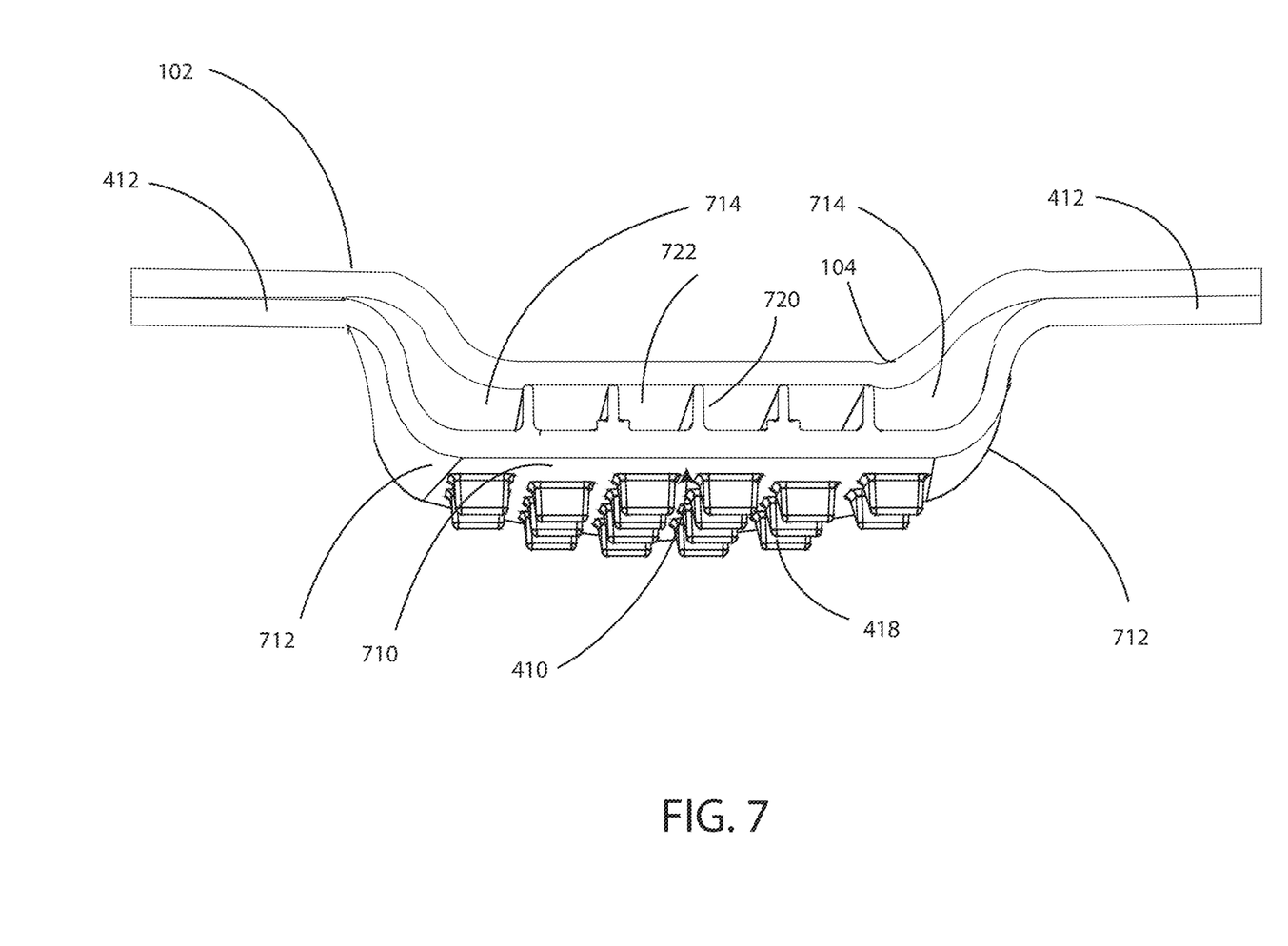
FIG. 7 is a horizontal cross-sectional view of a side protector in accordance with various embodiments herein.

FIG. 7 is a horizontal cross-sectional view of side protector 300 in accordance with various embodiments herein. The side protector 300 includes side flanges 412 between which a protective shield 410 extends. The shield portion includes ribbed projections 720 that extend inward toward the reinforcing element 104 of the fiberglass box pad 102. The shield 410 includes a central portion 710 that is positioned substantially in front of the reinforcing element 104, along with two angled side portions 712 that join the central portion 710 of the protective shield 410 to the side flanges 412. Gaps are formed between the protective shield 410 and the reinforcing element 104, including a central gap 722 and two side gaps 714. The ribbed projections 720 generally extend only from the central portion 710.

Figure 8:
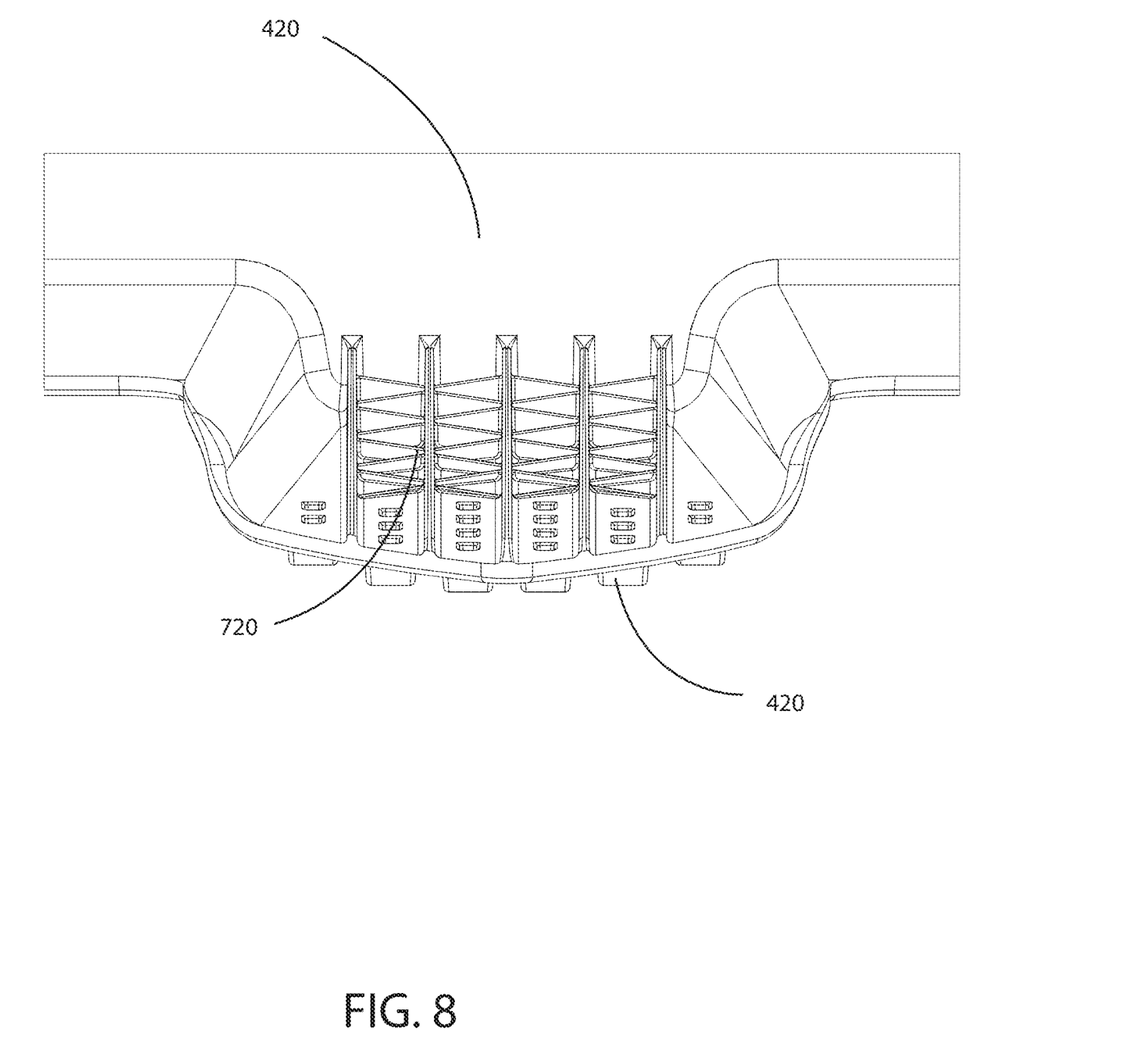
FIG. 8 is a bottom interior view of a side protector in accordance with various embodiments herein.

FIG. 8 is a bottom interior view of side protector 300 in accordance with various embodiments herein, showing the ribbed projections 720, along with the top lip 420 and the protective shield 410 (from which the ribbed projections 720 extend inward).

Figure 9:
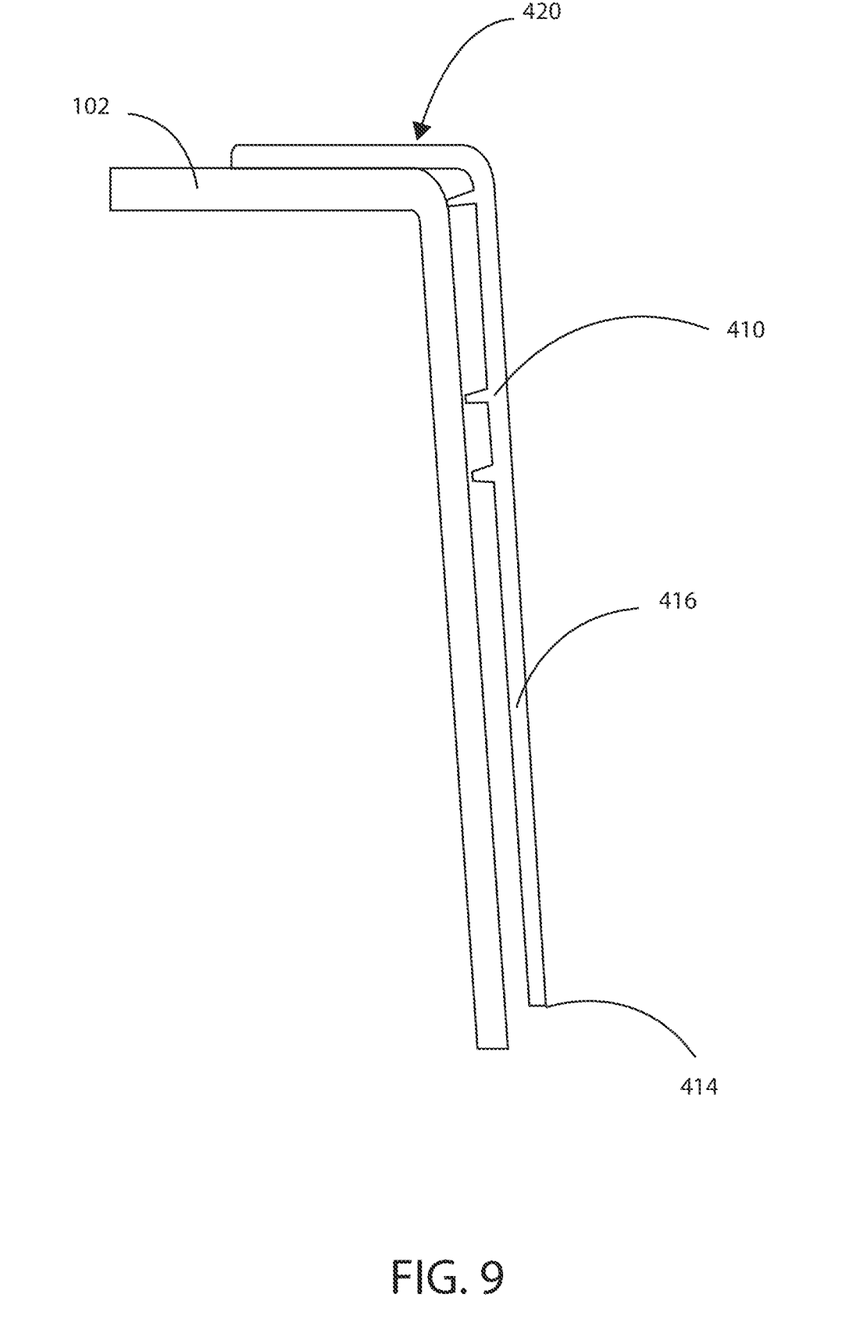
FIG. 9 is a vertical cross-sectional view of a side protector in accordance with various embodiments herein.
Figure 10:
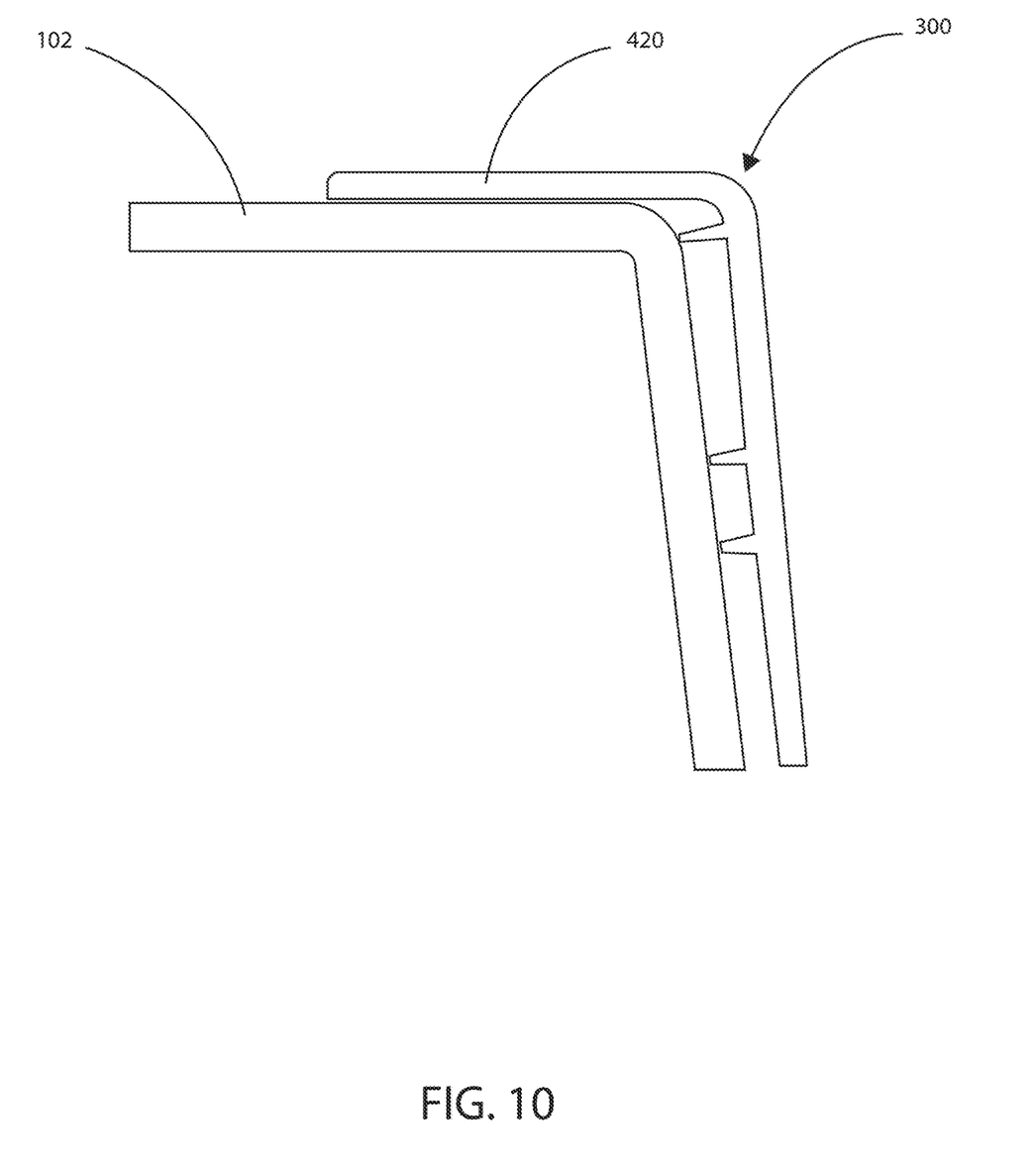
FIG. 10 is a close-up vertical cross-sectional view of a side protector in accordance with various embodiments herein.

FIG. 9 is a vertical cross-sectional view of side protector 300 in accordance with various embodiments herein. FIG. 10 is a close-up vertical cross-sectional view of side protector 300 in accordance with various embodiments herein. The side protector 300 has a tapering profile such that it is thicker near the top than it is at the bottom.

Figure 11:
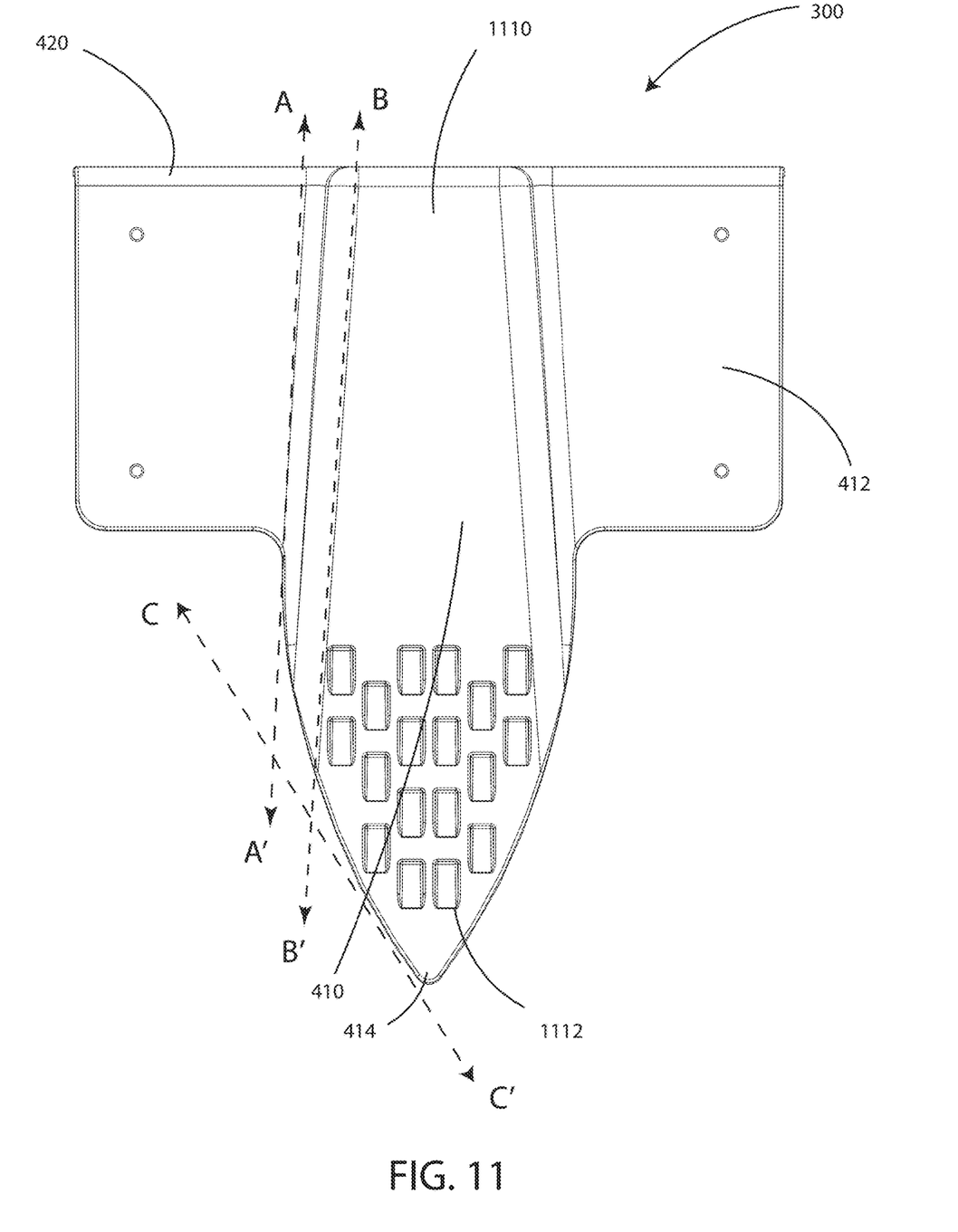
FIG. 11 is a front elevational view of a side protector in accordance with various embodiments herein.

FIG. 11 is a front elevational view of side protector 300 in accordance with various embodiments herein, showing how interior tapers A-A' and B-B' of the protective shield 410, while an opposite taper C-C' is present for the edge of the protective shield 410. Thus the upper portion 1110 of the protective shield 410 has an opposite taper to the lower portion 1112 and edge of the protective shield 410. In this manner the exterior edge of the protective shield 410 can readily penetrate into the ground, while the reverse taper to the upper portion 110 of the protective shield can help prevent the backing-out of the protective shield 410 and side protector 300.

In an embodiment, at least one side flange extends from the protective shield. In an embodiment, at least two side flanges extend from the protective shield. In an embodiment, an air pocket is formed between the protective shield and the reinforcing element. In an embodiment, the air pocket includes a central volume and two side volumes, the central and side volumes conforming to the surface of the sidewall reinforcing element.

In an embodiment, the air pocket includes a central volume and two side volumes. The central volume can include protrusions in contact with the surface of the reinforcing element and the side volumes not in contact with the reinforcing element.

In an embodiment, the air pocket includes a plurality of protrusions extending into the air pocket. In an embodiment, the air pocket is filled with a flexible material. In an embodiment, the flexible material includes foam. In an embodiment, the plurality of protrusions extending into the air pocket make contact with the sidewall reinforcing element. In an embodiment, the plurality of protrusions extending into the air pocket include elongate ribs.

In an embodiment, an air pocket extends around three sides of the reinforcing element.

In an embodiment, the shield includes an exterior taper.

In an embodiment, the shield has an interior taper reverse of the exterior taper In an embodiment, the reinforcing element has a wedge shaped cross section.

In an embodiment, at least one hole in the side flange is provided for inserting a fastener for securing the side flange to the utility box pad.

In an embodiment, the protector can further include one or more anti-heave protrusions. In an embodiment, one or more anti-heave protrusions are positioned on the pointed blade.

In an embodiment, the one or more anti-heave protrusions protrude outward from the pointed blade. In an embodiment, the one or more anti-heave protrusions are hollow. In an embodiment, the one or more anti-heave protrusions include a polygonal structure that extends from the pointed blade at an angle.

In an embodiment, the one or more glue channels are positioned on the first plate and the second plate.

In an embodiment, the one or more glue channels include a glue injection hole.

In an embodiment, the sidewall cover includes a unibody structure.

In an embodiment, the sidewall cover is formed from high-density polyethylene.

In an embodiment, the sidewall cover has a length of 12 inches to 18 inches.

In an embodiment, a sidewall cover for protecting sidewall reinforcing element of a utility box pad, the sidewall cover is included having a protective shield configured to extend over at least a portion of the sidewall reinforcing element, the protective shield can include a pointed blade configured to be pressed into the ground adjacent the utility box pad, further can include a lip, wherein the lip is positioned at the opposite end of the sidewall reinforcing element relative to the pointed blade, further can include at least one side flange extending from the protective shield, and further can include an air pocket behind the protective shield.

In an embodiment, the air pocket includes a central volume and two side volumes, the central and side volumes conforming to the surface of the sidewall reinforcing element.

In an embodiment, the air pocket includes a central volume and two side volumes, the central volume can include protrusions in contact with the surface of the reinforcing element and the side volumes not in contact with the reinforcing element.

In an embodiment, further can include an air pocket behind the protective shield.

In an embodiment, the air pocket is filled with a flexible material.

In an embodiment, the flexible material includes foam.

In an embodiment, the air pocket includes a plurality of protrusions extending into the air pocket.

In an embodiment, the side protectors include a plurality of protrusions extending into the air pocket and they make contact with the sidewall reinforcing element.

In an embodiment, the plurality of protrusions extending into the air pocket include elongate ribs.

In an embodiment, the air pocket extends around three sides of the reinforcing element.

In an embodiment, the blade includes an exterior taper.

In an embodiment, the blade includes a shield with an interior taper reverse of the exterior taper.

In an embodiment, the reinforcing element has a wedge-shaped cross section.

In an embodiment, the side protectors can further include at least one hole in the side flange for inserting a fastener for securing the side flange to the utility box pad.

In an embodiment, the side protectors can include one or more anti-heave protrusions.

In an embodiment, the side protectors can include one or more anti-heave protrusions positioned on the pointed blade.

In an embodiment, the one or more anti-heave protrusions protrude outward from the pointed blade.

In an embodiment, the one or more anti-heave protrusions are hollow.

In an embodiment, the one or more anti-heave protrusions include a polygonal structure that extends from the pointed blade at an angle.

In an embodiment, the flange can further include one or more glue channels.

In an embodiment, the one or more glue channels can include a glue injection hole.

In an embodiment, the sidewall cover includes a unibody structure.

In an embodiment, the sidewall cover is formed from high-density polyethylene.

In an embodiment, the sidewall cover has a length of 12 inches to 18 inches.

A variety of fasteners can be used, for example screws, nails, rivets, and the like. It will be appreciated that the side protector 300 can include a varying number of holes.

In some embodiments, the one or more anti-heave protrusions 416 can be positioned on the pointed blade on the side protector 300. In some embodiments, the anti-heave protrusions 416 can protrude outward from the pointed blade. The anti-heave protrusions 416 can be a variety of shapes. In some embodiments, the anti-heave protrusions 416 can be polygonal in shape. In other embodiments, the anti-heave protrusions 416 can be rectangular, conical, columnar, pyramidal, or the like. In some embodiments, the anti-heave protrusions 416 can have a protruding top portion void of material. In other embodiments, the anti-heave protrusions 416 can be solid.

As shown, the anti-heave protrusions 416 can be hollow. It will be appreciated that the anti-heave protrusions 416 can be filled with air, dirt, a cement, or a polymer material. It will further be appreciated that side protector 300 can include a varying number of anti-heave protrusions 416. For example, 1, 2, 3, 4, 5, 6, 7, 8, 9, 10, 11, 12, 13, or 14 anti-heave protrusions 416 can be included. In embodiments the number of anti-heave protrusions 416 can be in range wherein any of the foregoing number of anti-heave protrusions 416 can serve as the upper or lower bound of the range, provided that the upper bound is greater than the lower bound.

As shown, the anti-heave protrusions 416 can protrude out from the pointed blade at an angle. For example, the anti-heave protrusions 416 can protrude out from the pointed blade at a 30, 45, 60, or 75-degree angle. In embodiments the angle can be in range wherein any of the foregoing angles can serve as the upper or lower bound of the range, provided that the upper bound is greater than the lower bound. It will be appreciated that the anti-heave protrusions 416 are angled to resist any upward forces, for example ground heave, that could dislodge the side protector (not shown in this view).

It will be appreciated that the side protector 300 can have various shapes, sizes, and features.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application were specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A sidewall cover for protecting a sidewall reinforcing element of a utility box pad, the sidewall cover comprising:
   a protective shield configured to extend over at least a portion of the sidewall reinforcing element, the protective shield comprising a blade configured to be pressed into the ground adjacent the utility box pad,
   further comprising an air pocket between the sidewall cover and the sidewall reinforcing element, wherein the air pocket comprises a central volume and two side volumes, the central and side volumes conforming to the interior surface of the sidewall reinforcing element;
   wherein the air pocket is filled with a flexible material;
   wherein the flexible material comprises foam.

2. The sidewall cover for protecting a sidewall reinforcing element of a utility box pad of claim 1, further comprising a lip, wherein the lip is positioned at the opposite end of the sidewall reinforcing element from the blade.

3. The sidewall cover for protecting a sidewall reinforcing element of a utility box pad of claim 1, further comprising at least one side flange extending from the protective shield.

4. The sidewall cover for protecting a sidewall reinforcing element of a utility box pad of claim 1, further comprising two side flanges extending from the protective shield.

5. The sidewall cover for protecting a sidewall reinforcing element of a utility box pad of claim 1, the central volume comprising protrusions in contact with the surface of the reinforcing element.

6. The sidewall cover for protecting a sidewall reinforcing element of a utility box pad of claim 1, wherein the sidewall cover and the sidewall reinforcing element define an air pocket when the sidewall cover is attached to the reinforcing element.

7. The sidewall cover for protecting a sidewall reinforcing element of a utility box pad of claim 1, wherein the blade comprises an exterior taper.

8. The sidewall cover for protecting a sidewall reinforcing element of a utility box pad of claim 7, wherein shield interior has a taper reverse of the exterior taper.

9. The sidewall cover for protecting a sidewall reinforcing element of a utility box pad of claim 1, further comprising a side flange and at least one hole in the side flange for inserting a fastener for securing the side flange to the utility box pad.

10. The sidewall cover for protecting a sidewall reinforcing element of a utility box pad of claim 1, further comprising one or more anti-heave protrusions.

11. The sidewall cover for protecting a sidewall reinforcing element of a utility box pad of claim 10, wherein the one or more anti-heave protrusions are positioned on the blade.

12. The sidewall cover for protecting a sidewall reinforcing element of a utility box pad of claim 10, wherein the one or more anti-heave protrusions protrude outward from the blade.

13. A sidewall cover for protecting a sidewall reinforcing element of a utility box pad, the sidewall cover comprising:
   a protective shield configured to extend over at least a portion of the sidewall reinforcing element, the protective shield comprising a blade configured to be pressed into the ground adjacent the utility box pad further comprising an air pocket between the sidewall cover and the sidewall reinforcing element, wherein the air pocket comprises a central volume and two side volumes, the central and side volumes conforming to the interior surface of the sidewall reinforcing element;
wherein the air pocket comprises a plurality of protrusions extending into the air pocket:
wherein the plurality of protrusions extending into the air pocket make contact with the sidewall reinforcing element;
wherein the plurality of protrusions extending into the air pocket comprise elongate ribs; and
wherein the air pocket extends around three sides of the reinforcing element when the sidewall cover is coupled to the sidewall reinforcing element.

14. The sidewall cover for protecting a sidewall reinforcing element of a utility box pad of claim 13, wherein the plurality of protrusions extending into the air pocket make contact with the sidewall reinforcing element when the sidewall cover is coupled to the sidewall reinforcing element.

15. The sidewall cover for protecting a sidewall reinforcing element of a utility box pad of claim 11, wherein the plurality of protrusions extending into the air pocket comprise elongate ribs.

* * * * *